United States Patent
Takeda et al.

(10) Patent No.: US 7,072,173 B2
(45) Date of Patent: Jul. 4, 2006

(54) ELECTROLYTE FOR ELECTROLYTIC CAPACITOR AND ELECTROLYTIC CAPACITOR USING THE SAME

(75) Inventors: Masayuku Takeda, Mie (JP);
Masahiro Takehara, Ibaraki (JP);
Makoto Ue, Ibaraki (JP)

(73) Assignee: Mitsubishi Chemical Corporation, Tokyo (JP)

(*) Notice: Subject to any disclaimer, the term of this patent is extended or adjusted under 35 U.S.C. 154(b) by 0 days.

(21) Appl. No.: 10/704,803

(22) Filed: Nov. 12, 2003

(65) Prior Publication Data
US 2004/0095708 A1 May 20, 2004

Related U.S. Application Data (63) Continuation of application No. PCT/JP02/04571, filed on May 10, 2002.

(30) Foreign Application Priority Data

May 11, 2001 (JP) .............................. 2001-141405
Aug. 23, 2001 (JP) .............................. 2001-252628

(51) Int. Cl.
*H01G 9/00* (2006.01)
(52) U.S. Cl. ...................... 361/523; 361/525; 361/528; 361/529; 361/516; 29/25.03
(58) Field of Classification Search ........ 361/523–532, 361/516, 517, 519, 520, 508–512, 502–504; 429/94, 194, 218
See application file for complete search history.

(56) References Cited

U.S. PATENT DOCUMENTS

| | | | |
|---|---|---|---|
| 5,001,023 A * | 3/1991 | Cheshire et al. ............... | 429/94 |
| 5,457,599 A * | 10/1995 | Kuwae et al. ............... | 361/507 |
| 5,714,279 A * | 2/1998 | Zajac et al. .................. | 429/344 |
| 6,445,567 B1 * | 9/2002 | Komatsuki et al. ......... | 361/518 |

FOREIGN PATENT DOCUMENTS

| | | |
|---|---|---|
| JP | 01-124210 A | 5/1989 |
| JP | 06-196367 A | 7/1994 |
| JP | 10-241999 A | 9/1998 |

* cited by examiner

*Primary Examiner*—Nguyen T. Ha
(74) *Attorney, Agent, or Firm*—Oblon, Spivak, McClelland, Maier & Neustadt, P.C.

(57) ABSTRACT

An electrolyte for an electrolytic capacitor which is high in electrolytic conductivity, excellent in heat stability and high in withstand voltage. An electrolyte for an electrolytic capacitor including a tetrafluoroaluminate ion; and an electrolyte for an electrolytic capacitor containing a salt and a solvent, characterized in that electrolytic conductivity X (mS·cm$^{-1}$) at 25° C. and withstand voltage Y (V) of a capacitor satisfy the relationships of formulae (I):Y≧−7.5X+150, and X≦4, Y>0.

29 Claims, 3 Drawing Sheets

ELECTROLYTE FOR ELECTROLYTIC CAPACITOR AND ELECTROLYTIC CAPACITOR USING THE SAME

This application is a continuation of PCT/JP02/04571, filed May 10, 2002.

FIELD OF THE INVENTION

The present invention relates to an electrolyte for an electrolytic capacitor and an electrolytic capacitor using the same.

Background Art

Electrolytic capacitors have a feature such that they have a large capacitance even in a small size, and they are widely used in a low frequency filter and a by-pass. The electrolytic capacitors generally have a structure such that an anode foil and a cathode foil are together spirally wound via a separator, and placed and sealed in a casing (see FIGS. 1 and 2). As the anode foil, a metal such as aluminum or tantalum, having an insulating oxide film formed thereon as a dielectric layer is generally used, and as the cathode foil, an etched aluminum foil is generally used. For preventing an occurrence of short-circuiting between the anode and the cathode, the separator disposed between the anode and the cathode is impregnated with an electrolyte, and it functions as a substantial cathode. Thus, the electrolyte is an important constituent which largely affects the properties of the electrolytic capacitor.

Among the properties of the electrolyte, an electrolytic conductivity directly affects the energy loss and impedance properties of the electrolytic capacitor, and therefore, vigorous studies are being made on the development of an electrolyte having a high electrolytic conductivity. For example, electrolytes comprising a quaternary ammonium salt (Japanese Prov. Patent Publication Nos. 145715/1987 and 145713/1987) or a quaternary amidinium salt (International Patent Publication No. WO95/15572 and Japanese Prov. Patent Publication No. 283379/1997) of phthalic acid or maleic acid dissolved in an aprotic solvent such as γ-butyrolactone, have been proposed. However, these electrolytes have unsatisfactory ionic mobility and unsatisfactory anodization of the anode aluminum, and therefore, they can be used only in capacitors at a rated voltage of 35 V or lower in general. Specifically, in these electrolytes, generally, only those having an electrolytic conductivity X as low as about 13 mS·cm$^{-1}$ or less and a withstand voltage Y as low as about 100 V or less are obtained, and the electrolytes having an electrolytic conductivity X as relatively high as 13 mS·cm$^{-1}$ have a withstand voltage as low as about 60 V, while the electrolytes having a withstand voltage Y as relatively high as 100 V have an electrolytic conductivity as low as about 8 mS·cm$^{-1}$.

The electrolyte for an electrolytic capacitor is required to have higher electrolytic conductivity, more excellent thermal stability and more excellent voltage proof property, and it is needed to own all of these properties simultaneously. Further, the electrolytic capacitor is required to have lower impedance, more excellent thermal stability and more excellent voltage proof property, and it is needed to own all of these properties simultaneously. However, an electrolyte for an electrolytic capacitor and an electrolytic capacitor which meet such requirements have not yet been realized.

DISCLOSURE OF THE INVENTION

The present inventors have conducted intensive studies to solve the above-mentioned problems, and they have found that an excellent electrolyte for an electrolytic capacitor and an electrolytic capacitor dramatically improved in performance as compared to conventional ones can be obtained, when a selection of a salt (a cation component and an anion component) or a selection of a solvent constituting the electrolyte is done carefully, or the electrolyte meets a specific requirement, and the present invention has been completed.

The present invention (1) is an electrolyte for an electrolytic capacitor comprising a tetrafluoroaluminate ion, and the electrolyte for an electrolytic capacitor, whererin the tetrafluoroaluminate ion is contained in the form of at least one salt selected from the group consisting of quaternary onium salts, amine salts, ammonium salts and alkali metal salts of tetrafluoroaluminate.

Further, the present invention is an electrolytic capacitor using the electrolyte for an electrolytic capacitor of the present invention (1), and an electrochemical element using a conductive material comprising a tetrafluoroaluminate ion.

Still further, the present invention (2) is an electrolyte for an electrolytic capacitor containing a salt and a solvent, wherein the electrolyte satisfies the relationships of formulae (I):

$$Y \geq -7.5X+150, \text{ and } X \geq 4, Y>0 \tag{I}$$

wherein X represents an electrolytic conductivity (mS·cm$^{-1}$) at 25° C., and Y represents a withstand voltage (V) of a capacitor, and the electrolyte for an electrolytic capacitor which further satisfies the relationships of formulae (II):

$$Y \geq -7.5X+150, \text{ and } X \geq 8, Y>0 \tag{II}$$

Further, the present invention is the electrolyte for an electrolytic capacitor of the present invention (2), wherein the electrolyte contains 50% by weight or more of the solvent, and a weight ratio of a solvent having a boiling point of 250° C. or higher, a melting point of −60 to 40° C. and a permittivity (ε, 25° C.) of 25 or more is equal to or larger than a weight ratio of a solvent having a boiling point of 190° C. or higher to lower than 250° C., a melting point of −60 to 40° C. and a permittivity (ε, 25° C.) of 25 or more, in the solvent, and the electrolyte for an electrolytic capacitor of the present invention (2), wherein the electrolyte contains 50% by weight or more of the solvent and a weight ratio of a solvent having a boiling point of 190° C. or higher to lower than 250° C., a melting point of −60 to 40° C. and a permittivity (ε, 25° C.) of 25 or more is larger than a weight ratio of a solvent having a boiling point of 250° C. or higher, a melting point of −60 to 40° C. and a permittivity (ε, 25° C.) of 25 or more, in the solvent.

Still Further, the present invention is an electrolytic capacitor using the electrolyte for an electrolytic capacitor of the present invention (2).

BEST MODE FOR CARRYING OUT THE INVENTION

Hereinbelow, the electrolyte for an electrolytic capacitor and the electrolytic capacitor of the present invention will be described in detail.

The first embodiment of the present invention is an electrolyte for an electrolytic capacitor comprising a tetrafluoroaluminate ion. It has been found that when a tetrafluoroaluminate ion is contained as an anion component in an electrolyte for an electrolytic capacitor, the electrolyte having high electrolytic conductivity and excellent thermal stability as well as excellent voltage proof property can be obtained.

The tetrafluoroaluminate ion is a monovalent anion comprised of four fluorine atoms bonded to an aluminum atom, represented by the chemical formula: $AlF_4^-$, and it is referred to also as tetrafluoroaluminate.

The electrolyte of the present invention uses a tetrafluoroaluminate ion as all of or part of the anion component, and the amount of the tetrafluoroaluminate ion in the anion component is preferably 5 to 100 mol %, more preferably 30 to 100 mol %, especially preferably 50 to 100 mol %, most preferably 100 mol %.

The electrolyte of the present invention may contain a tetrafluoroaluminate ion in the form of a salt in the electrolyte. It is preferred that the tetrafluoroaluminate salt is at least one member selected from the group consisting of quaternary onium salts, amine salts, an ammonium salts and alkali metal salts.

Preferred examples of quaternary onium salts include quaternary ammonium salts, quaternary phosphonium salts, quaternary imidazolium salts and quaternary amidinium salts.

As preferred examples of quaternary ammonium ions of the quaternary ammonium salts, there can be mentioned the following.

(i) Tetraalkylammonium

Examples include tetramethylammonium, ethyltrimethylammonium, diethyldimethylammonium, triethylmethylammonium, tetraethylammonium, trimethyl-n-propylammonium, trimethylisopropylammonium, trimethyl-n-butylammonium, trimethylisobutylammonium, trimethyl-t-butylammonium, trimethyl-n-hexylammonium, dimethyldi-n-propylammonium, dimethyldiisopropylammonium, dimethyl-n-propylisopropylammonium, methyltri-n-propylammonium, methyltriisopropylammonium, methyldi-n-propylisopropylammonium, methyl-n-propyldiisopropylammonium, triethyl-n-propylammonium, triethylisopropylammonium, triethyl-n-butylammonium, triethylisobutylammonium, triethyl-t-butylammonium, dimethyldi-n-butylammonium, dimethyldiisobutylammonium, dimethyldi-t-butylammonium, dimethyl-n-butylethylammonium, dimethylisobutylethylammonium, dimethyl-t-butylethylammonium, dimethyl-n-butylisobutylammonium, dimethyl-n-butyl-t-butylammonium, dimethylisobutyl-t-butylammonium, diethyldi-n-propylammonium, diethyldiisopropylammonium, diethyl-n-propylisopropylammonium, ethyltri-n-propylammonium, ethyltriisopropylammonium, ethyldi-n-propylisopropylammonium, ethyl-n-propyldiisopropylammonium, diethylmethyl-n-propylammonium, ethyldimethyl-n-propylammonium, ethylmethyldi-n-propylammonium, diethylmethylisopropylammonium, ethyldimethylisopropylammonium, ethylmethyldiisopropylammonium, ethylmethyl-n-propylisopropylammonium, tetra-n-propylammonium, tetraisopropylammonium, n-propyltriisopropylammonium, di-n-propyldiisopropylammonium, tri-n-propylisopropylammonium, trimethylbutylammonium, trimethylpentylammonium, trimethylhexylammonium, trimethylheptylammonium, trimethyloctylammonium and trimethylnonylammonium. These individually have 4 to 12 carbon atoms in total, but in the electrolyte of the present invention, those having 13 or more carbon atoms in total can also be used, and examples include trimethyldecylammonium, trimethylundecylammonium and trimethyldodecylammonium.

(ii) Aromatic Substituted Ammonium

Examples include those having 4 to 12 carbon atoms in total, such as trimethylphenylammonium, and those having 13 or more carbon atoms in total such as tetraphenylammonium.

(iii) Aliphatic Cyclic Ammonium

Examples include pyrrolidinium such as N,N-dimethylpyrrolidinium, N-ethyl-N-methylpyrrolidinium, N,N-diethylpyrrolidinium and N,N-tetramethylenepyrrolidinium; piperidinium such as N,N-dimethylpiperidinium, N-ethyl-N-methylpiperidinium, N,N-diethylpiperidinium, N,N-tetramethylenepiperidinium and N,N-pentamethylenepiperidinium; and morpholinium such as N,N-dimethylmorpholinium, N-ethyl-N-methylmorpholinium and N,N-diethylmorpholinium. These individually have 4 to 12 carbon atoms in total, but in the electrolyte of the present invention, those having 13 or more carbon atoms in total can also be used.

(iv) Ions of Nitrogen-containing Heterocyclic Aromatic Compound

Examples include pyridinium such as N-methylpyridinium, N-ethylpyridinium, N-n-propylpyridinium, N-isopropylpyridinium and N-n-butylpyridinium. These individually have 4 to 12 carbon atoms in total, but in the electrolyte of the present invention, those having 13 or more carbon atoms in total can also be used.

Preferred examples of quaternary phosphonium ions of the quaternary phosphonium salts include tetramethylphosphonium, triethylmethylphosphonium and tetraethylphosphonium. These individually have 4 to 12 carbon atoms in total, but in the electrolyte of the present invention, those having 13 or more carbon atoms in total can also be used.

Preferred examples of quaternary imidazolium ions of the quaternary imidazolium salts include 1,3-dimethylimidazolium, 1,2,3-trimethylimidazolium, 1-ethyl-3-methylimidazolium, 1-ethyl-2,3-dimethylimidazolium, 1,3-diethylimidazolium, 1,2-diethyl-3-methylimidazolium, 1,3-diethyl-2-methylimidazolium, 1,2-dimethyl-3-n-propylimidazolium, 1-n-butyl-3-methylimidazolium, 1-methyl-3-n-propyl-2,4-dimethylimidazolium, 1,2,3,4-tetramethylimidazolium, 1,2,3,4,5-pentamethylimidazolium, 2-ethyl-1,3-dimethylimidazolium, 1,3-dimethyl-2-n-propylimidazolium, 1,3-dimethyl-2-n-pentylimidazolium, 1,3-dimethyl-2-n-heptylimidazolium, 1,3,4-trimethylimidazolium, 2-ethyl-1,3,4-trimethylimidazolium, 1,3-dimethylbenzimidazolium, 1-phenyl-3-methylimidazolium, 1-benzyl-3-methylimidazolium, 1-phenyl-2,3-dimethylimidazolium, 1-benzyl-2,3-dimethylimidazolium, 2-phenyl-1,3-dimethylimidazolium and 2-benzyl-1,3-dimethylimidazolium. These are individually quaternary imidazolium having 4 to 12 carbon atoms in total.

In the electrolyte of the present invention, quaternary imidazolium having 13 or more carbon atoms in total can also be used, and preferred examples include 1,3-dimetyl-2-n-undecylimidazolium and 1,3-dimetyl-2-n-heptadecylimidazolium. Further, in the electrolyte of the present invention, quaternary imidazolium containing a hydroxyl group or an ether group can also be used, and preferred examples include 2-(2'-hydroxy)ethyl-1,3-dimethylimidazolium, 1-(2'-hydroxy)ethyl-2,3-dimethylimidazolium, 2-ethoxymethyl-1,3-dimethylimidazolium and 1-ethoxymethyl-2,3-dimethylimidazolium.

Preferred examples of the quaternary amidinium include imidazolinium such as 1,3-dimethylimidazolinium, 1,2,3-trimethylimidazolinium, 1-ethyl-3-methylimidazolinium, 1-ethyl-2,3-dimethylimidazolinium, 1,3-diethylimidazolinium, 1,2-diethyl-3-methylimidazolinium, 1,3-diethyl-2-methylimidazolinium, 1,2-dimethyl-3-n-propylimidazolinium, 1-n-butyl-3-methylimidazolinium, 1,2,4-trimethyl-3-n-propylimidazolinium, 1,2,3,4-tetramethylimidazolinium, 2-ethyl-1,3-dimethylimidazolinium, 1,3-dimethyl-2-n-propylimidazolinium, 1,3-dimethyl-2-n-pentylimidazolinium, 1,3-dimethyl-2-n-heptylimidazolinium, 1,3,4-trimethylimidazolinium, 2-ethyl-1,3,4-trimethylimidazolinium, 1-phenyl-3-methylimidazolinium, 1-benzyl-3-methylimidazolinium, 1-phenyl-2,3-dimethylimidazolinium, 1-benzyl-2,3-dimethylimidazolinium, 2-phenyl-1,3-dimethylimidazolinium and 2-benzyl-1,3-dimethylimidazolinium; tetrahydropyrimidinium such as 1,3-dimethyltetrahydropyrimidinium, 1,3-diethyltetrahydropyrimidinium, 1-ethyl-3-methyltetrahydropyrimidinium, 1,2,3-trimethyltetrahydropyrimidinium, 1,2,3-triethyltetrahydropyrimidinium, 1-ethyl-2,3-dimethyltetrahydropyrimidinium, 2-ethyl-1,3-dimethyltetrahydropyrimidinium, 1,2-diethyl-3-methyltetrahydropyrimidinium, 1,3-diethyl-2-methyltetrahydropyrimidinium, 5-methyl-1,5-diazabicyclo[4.3.0]nonenium-5 and 8-methyl-1,8-diazabicyclo[5.4.0]undecenium-7. These are individually quaternary amidinium having 4 to 12 carbon atoms in total.

In the electrolyte of the present invention, quaternary amidinium having 13 carbon atoms or more in total can also be used, and preferred examples include 1,3-dimethyl-2-n-undecylimidazolinium and 1,3-dimethyl-2-n-heptadecylimidazolinium. Further, in the electrolyte of the present invention, quaternary amidinium containing a hydroxyl group or an ether group can also be used, and preferred examples include 2-(2'-hydroxy)ethyl-1,3-dimethylimidazolinium, 1-(2'-hydroxy)ethyl-2,3-dimethylimidazolinium, 2-ethoxymethyl-1,3-dimethylimidazolinium and 1-ethoxymethyl-2,3-dimethylimidazolinium.

The electrolyte of the present invention may contain a tetrafluoroaluminate ion in the form of not only a quaternary onium salt but also an amine salt, an ammonium salt ($NH_4^+AlF_4^-$) or an alkali metal salt.

Preferred examples of amines of the amine salt include tertiary amines such as trimethylamine, ethyldimethylamine, diethylmethylamine, triethylamine, pyridine, N-methylimidazole, 1,5-diazabicyclo[4.3.0]nonene-5 and 1,8-diazabicyclo[5.4.0]undecene-7. In addition to the tertiary amines, primary amines and secondary amines can be used, and examples include diethylamine, diisopropylamine, isobutylamine, di-2-ethylhexylamine, pyrrolidine, piperidine, morpholine, hexamethyleneimine, ethylamine, n-propylamine, isopropylamine, t-butylamine, sec-butylamine, 2-ethylhexylamine, 3-methoxypropylamine and 3-ethoxypropylamine. Preferred examples of alkali metals include lithium, sodium, potassium, rubidium and cesium.

Among these cation components, from the viewpoint of obtaining an electrolyte having high electrolytic conductivity, quaternary onium having 4 to 12 carbon atoms in total are preferred, and of these, preferred is at least one compound selected from the group consisting of tetraethylammonium, triethylmethylammonium, diethyldimethylammonium, ethyltrimethylammonium, tetramethylammonium, N,N-dimethylpyrrolidinium, N-ethyl-N-methylpyrrolidinium, 1,3-dimethylimidazolium, 1,2,3-trimethylimidazolium, 1-ethyl-3-methylimidazolium, 1-ethyl-2,3-dimethylimidazolium, 1,2,3,4-tetramethylimidazolium, 1,3-diethylimidazolium, 2-ethyl-1,3-dimethylimidazolium, 1,3-dimethyl-2-n-propylimidazolium, 1,3-dimethyl-2-n-pentylimidazolium, 1,3-dimethyl-2-n-heptylimidazolium, 1,3,4-trimethylimidazolium, 2-ethyl-1,3,4-trimethylimidazolium, 1,3-dimethylbenzimidazolium, 1-phenyl-3-methylimidazolium, 1-benzyl-3-methylimidazolium, 1-phenyl-2,3-dimethylimidazolium, 1-benzyl-2,3-dimethylimidazolium, 2-phenyl-1,3-dimethylimidazolium, 2-benzyl-1,3-dimethylimidazolium, 1,3-dimethylimidazolinium, 1,2,3-trimethylimidazolinium, 1-ethyl-3-methylimidazolinium, 1-ethyl-2,3-dimethylimidazolinium, 1,2,3,4-tetramethylimidazolinium, 1,3-diethylimidazolinium, 2-ethyl-1,3-dimethylimidazolinium, 1,3-dimethyl-2-n-propylimidazolinium, 1,3-dimethyl-2-n-pentylimidazolinium, 1,3-dimethyl-2-n-heptylimidazolinium, 1,3,4-trimethylimidazolinium, 2-ethyl-1,3,4-trimethylimidazolinium, 1-phenyl-3-methylimidazolinium, 1-benzyl-3-methylimidazolinium, 1-phenyl-2,3-dimethylimidazolinium, 1-benzyl-2,3-dimethylimidazolinium, 2-phenyl-1,3-dimethylimidazolinium and 2-benzyl-1,3-dimethylimidazolinium, and more preferred is 1-ethyl-2,3-dimethylimidazolinium or 1,2,3,4-tetramethylimidazolinium.

The electrolyte of the present invention may contain an anion component other than the tetrafluoroaluminate ion, and specific examples include a fluorine-containing inorganic ion such as a tetrafluoroborate ion, a hexafluorophosphate ion, a hexafluoroarsenate ion, a hexafluoroantimonate ion, a hexafluoroniobate ion and a hexafluorotantalate ion; a carboxylate ion such as a phthalate ion, a maleate ion, a salicylate ion, a benzoate ion and an adipate ion; a sulfonate ion such as a benzenesulfonate ion, a toluenesulfonate ion, a dodecylbenzenesulfonate ion, a trifluoromethanesulfonate ion and a perfluorobutanesulfonate ion; an inorganic oxoacid ion such as a borate ion and a phosphate ion; a bis(trifluoromethanesulfonyl)imide ion; a bis(pentafluoroethanesulfonyl)imide ion; a tris(trifluoromethanesulfonyl)methide ion; a perfluoroalkylborate ion; and a perfluoroalkylphosphate ion. As the salt, a hydrogenphthalate, a hydrogenmaleate, etc. can be used. For example, when a hydrogenphthalate, a hydrogenmaleate, etc. is used in combination with a tetrafluoroaluminate, it is preferred that the tetrafluoroaluminate is a main component, and the amount of the tetrafluoroaluminate is preferably 50% by weight or more, more preferably 60% by weight or more, further preferably 70% by weight or more based on the total weight of the salts, and a larger tetrafluoroaluminate amount is preferred.

When the tetrafluoroaluminate in the present invention is used in an electrolytic capacitor, it is required that the tetrafluoroaluminate have a high purity, and therefore, the tetrafluoroaluminate is used after purified by recrystallization or extraction with a solvent so that it has a desired purity, if necessary.

The concentration of the tetrafluoroaluminate in the electrolyte of the present invention is preferably 5 to 40% by weight, further preferably 10 to 35% by weight. The reason for this is as follows: when the tetrafluoroaluminate concentration is too low, only a low electrolytic conductivity can be obtained, and when the tetrafluoroaluminate concentration is too high, an increase of the electrolyte in viscosity or deposition of a salt at low temperatures is likely to occur, etc. Generally, the lower the concentration is, the withstand voltage of an electrolyte for electrolytic capacitor tend to become higher, and hence the optimum concentration can be determined from a desired rated voltage of the capacitor. The electrolyte of the present invention may be either a high-concentration solution containing 50% or more of a salt or a normal temperature molten salt.

From the viewpoint of obtaining an electrolyte having further excellent electrolytic conductivity and thermal stability as well as voltage proof property, it is preferred that the electrolyte of the present invention contains 50% by weight or more of a solvent. As the solvent, there can be mentioned at least one solvent selected from the group consisting of carbonic esters, carboxylic esters, phosphoric esters, nitrites, amides, sulfones, alcohols and water, and it is preferred that the solvent is selected from carbonic esters, carboxylic esters, phosphoric esters, nitrites, amides, sulfones and alcohols, which tend to exhibit stable properties with a lapse of time when used in an electrolyte. When water is used as a solvent, it is preferred that water and another solvent are used in combination, namely, water is used as part of the solvent.

Specific examples of solvents include the following: carbonic esters such as linear carbonic esters (e.g., linear carbonic esters such as dimethyl carbonate, ethylmethyl carbonate, diethyl carbonate, diphenyl carbonate and methylphenyl carbonate) and cyclic carbonic esters (e.g., cyclic carbonic esters such as ethylene carbonate, propylene carbonate, ethylene 2,3-dimethylcarbonate, butylene carbonate, vinylene carbonate and ethylene 2-vinylcarbonate); carboxylic esters such as aliphtatic carboxylic esters (e.g., methyl formate, methyl acetate, methyl propionate, ethyl acetate, propyl acetate, butyl acetate and amyl acetate), aromatic carboxylic esters (e.g., aromatic carboxylic esters such as methyl benzoate and ethyl benzoate) and lactones (e.g., γ-butyrolactone, γ-valerolactone and δ-valerolactone); phosphoric esters such as trimethyl phosphate, ethyldimethyl phosphate, diethylmethyl phosphate and triethyl phosphate; nitriles such as acetonitrile, propionitrile, methoxypropionitrile, glutaronitrile, adiponitrile and 2-methylglutaronitrile; amides such as N-methylformamide, N-ethylformamide, N,N-dimethylformamide, N,N-dimethylacetamide and N-methylpyrrolidinone; sulfones such as dimethyl sulfone, ethylmethyl sulfone, diethyl sulfone, sulfolane, 3-methylsulfolane and 2,4-dimethylsulfolane; alcohols such as ethylene glycol, propylene glycol, ethylene glycol monomethyl ether and ethylene glycol monoethyl ether; ethers such as ethylene glycol dimethyl ether, ethylene glycol diethyl ether, 1,4-dioxane, 1,3-dioxolane, tetrahydrofuran, 2-methyltetrahydrofuran, 2,6-dimethyltetrahydrofuran and tetrahydropyran; sulfoxides such as dimethyl sulfoxide, methylethyl sulfoxide and diethyl sulfoxide; 1,3-dimethyl-2-imidazolidinone; 1,3-dimethyl-3,4,5,6-tetrahydro-2(1H)-pyrimidinone; and 3-methyl-2-oxazolidinone.

From the viewpoint of obtaining an electrolyte having more excellent electrolytic conductivity, a non-aqueous solvent having a permittivity (ε, 25° C.) of 25 or more can be preferably used, and from the viewpoint of safety, a non-aqueous solvent having a flash point of 70° C. or higher can be preferably used.

From the viewpoint of obtaining an electrolyte having more excellent thermal stability, the solvent preferably contains a solvent having a boiling point of 250° C. or higher, a melting point of −60 to 40° C. and a permittivity (ε, 25° C.) of 25 or more in an amount of 25% by weight or more, more preferably 40% by weight or more, especially preferably 50% by weight or more, based on the total weight of the solvents. Examples of such solvents include sulfones, and especially preferred are sulfolane and 3-methylsulfolane. By using these solvents in combination in the electrolyte, there can be obtained an electrolytic capacitor having low impedance and high withstand voltage which ensures that it can operate for 1,000 hours or longer at an environment temperature of 110 to 150° C.

Further, from the viewpoint of obtaining an electrolytic capacitor having lower impedance, the solvent preferably contains a solvent having a boiling point of 190° C. or higher to lower than 250° C., a melting point of −60 to 40° C. and a permittivity (ε, 25° C.) of 25 or more in an amount of 25% by weight or more, more preferably 40% by weight or more, especially preferably 50% by weight or more, based on the total weight of the solvents. Examples of such solvents include carbonic esters, carboxylic esters, phosphoric esters, nitriles, amides and alcohols, and especially preferred are γ-butyrolactone and ethylene glycol. By using these solvents in combination in the electrolyte, an electrolytic capacitor having extremely low impedance and high withstand voltage can be obtained.

As especially preferred electrolytes, from the viewpoint of achieving excellent thermal stability, there can be mentioned electrolytes for an electrolytic capacitor, wherein sulfolane is a solvent and 1-ethyl-2,3-dimethylimidazolinium tetrafluoroaluminate or 1,2,3,4-tetramethylimidazolinium tetrafluoroaluminate in an amount of 5 to 40% by weight based on the total weight of the electrolyte is added thereto; from the viewpoint of obtaining an electrolytic capacitor having low impedance, there can be mentioned electrolytes for an electrolytic capacitor, wherein γ-butyrolactone is a solvent and 1-ethyl-2,3-dimethylimidazolinium tetrafluoroaluminate or 1,2,3,4-tetramethylimidazolinium tetrafluoroaluminate in an amount of 5 to 40% by weight based on the total weight of the electrolyte is added thereto. A solvent using both sulfolane and γ-butyrolactone is also preferred.

In the electrolyte of the present invention, in addition to the salt and the solvent, different additives may be used. There are various objects for adding an additive to the electrolyte, and there can be mentioned the improvement of electrolytic conductivity, the improvement of thermal stability, suppression of deterioration of an electrode due to hydration or dissolution, suppression of gas generation, the improvement of voltage proof and the improvement of wettability. With respect to the content of an additive, there is no particular limitation, but the additive content is preferably in the range of from 0.1 to 20% by weight, more preferably in the range of from 0.5 to 10% by weight.

Examples of such additives include nitro compounds such as p-nitrophenol, m-nitroacetophenone and p-nitrobenzoic acid; phosphorus compounds such as dibutyl phosphate, monobutyl phosphate, dioctyl phosphate, monooctyl octylphosphonate and phosphoric acid; boron compounds such as complex compounds of boric acid and a polyhydric alcohol (e.g., ethylene glycol, glycerol, mannitol and polyvinyl alcohol); metal oxide fine particles such as silica and aluminosilicate; polyalkylene glycols such as polyethylene glycol and polypropylene glycol, and copolymers thereof; and surfactants such as silicone oil.

The electrolyte of the present invention may be used in the form of what is called gelled electrolyte obtained by solidification by adding a polymer compound to the electrolyte. Examples of polymers used in the gelled electrolyte include polyethylene oxides, polyacrylonitriles, polytetrafluoroethylenes, polyvinylidene fluorides and polymethyl methacrylates.

In the electrolyte of the present invention, when a non-aqueous solvent is used as a solvent for the electrolyte, the moisture content is controlled so that the life properties of a capacitor using such an electrolyte are more stable. It is generally known that, when a large amount of moisture is contained in the electrolyte of an electrolytic capacitor using a non-aqueous solvent, aluminum used in an anode or a cathode deteriorates due to hydration and gas generates at the same time, during the use of the capacitor for a long term. It is also known that, when the electrolyte contains no moisture, the anodization in restoration of the anode oxide film is likely to be lowered.

However, conventional electrolytes and capacitors have been used in a region of the rated voltage as low as 35 V or lower, and therefore the effect on the life properties of the capacitor is small even when about 3% by weight of moisture is present. On the other hand, the capacitor using the electrolyte of the present invention can be used in a region of the rated voltage as high as 100 V and meets a requirement of high heat resistance, and therefore the effect of the moisture content is large as compared to the conventional ones. When a non-aqueous solvent is used, the electrolyte of the present invention preferably has a moisture content in the electrolyte of 1% by weight or less, and preferably 0.01 to 1% by weight, especially preferably 0.01 to 0.1% by weight, taking the above anodization into consideration.

The present invention also provides an electrolytic capacitor using the electrolyte of the present invention. Examples of electrolytic capacitors include aluminum electrolytic capacitors, tantalum electrolytic capacitors and niobium electrolytic capacitors. With respect to the structure and material of the electrolytic capacitor, there is no particular limitation as long as the electrolyte of the present invention is used. Therefore, all the conventionally used electrolytic capacitors and recently proposed electrolytic capacitors using the electrolyte of the present invention are involved within the scope of the present invention.

In the aluminum electrolytic capacitor of the present invention, for example, an element formed by spirally winding an anode foil and a cathode foil via a separator paper is used. As the anode foil, an aluminum foil having a purity of 99.9% which is subjected to surface treatment by chemical or electrochemical etching in an acid solution and is then subjected to anodization treatment in an aqueous solution of ammonium adipate, boric acid or phosphoric acid to form a layer of an aluminum oxide film on the surface, may be used. As the cathode foil, an aluminum foil having a purity of 99.9% which is subjected to surface treatment may be used. Further, as the cathode foil, an etched aluminum foil having a titanium nitride thin film formed on its surface (for example, described in Japanese Prov. Patent Publication No. 186054/1997) may be used. The separator in the capacitor element having such a construction is impregnated with the electrolyte of the present invention. The element having the separator impregnated with the electrolyte is stored in a cylindrical outer casing with a bottom comprised of aluminum, and a sealing material made of a butyl rubber is inserted into the opening end portion of the outer casing, and then the electrolytic capacitor is sealed by drawing-processing the end portion of the outer casing to obtain an aluminum electrolytic capacitor. It is more preferred that the surface of the sealing material is coated with a resin such as Teflon, or is covered with a sheet such as bakelite, since the transmission of solvent vapor is lowered.

As the separator, paper such as manila paper and kraft paper is generally used, but nonwoven fabric of glass fiber, polypropylene or polyethylene can also be used. As the butyl rubber used in the sealing material, there can be used an elastomer which is obtained by adding a reinforcing agent (e.g., carbon black), a bulking agent (e.g., clay, talc and calcium carbonate), a processing aid (e.g., stearic acid and zinc oxide), a vulcanizing agent, etc. to a raw rubber comprised of a copolymer of isobutylene and isoprene and kneading them, and then rolling and molding the resultants. As the vulcanizing agent, alkylphenol-formalin resins; peroxides (e.g., dicumyl peroxide, 1,1-di-(t-butylperoxy)-3,3,5-trimethylcyclohexane and 2,5-dimethyl-2,5-di-(t-butylperoxy)hexane); quinoids (e.g., p-quinonedioxime and p,p'-dibenzoylquinonedioxime); and sulfur can be used.

The aluminum electrolytic capacitor of the present invention may have a hermetic sealing structure or a structure such that a resin casing containing the capacitor is sealed (for example, described in Japanese Prov. Patent Publication No. 148384/1996). In case of the aluminum electrolytic capacitor having a rubber sealing structure, gas permeates through the rubber to some extent, and therefore a solvent volatilizes from the inside of the capacitor to the air in a high-temperature environment, or moisture enters the capacitor from the air in a high-temperature high-humidity environment. In such severe environments, the capacitor suffers unfavorable changes in properties, e.g., lowering of the capacitance. On the other hand, in case of the capacitor having a hermetic sealing structure or a structure such that a resin casing containing the capacitor is sealed, the gas transmission is extremely small, and therefore the capacitor exhibits stable properties even in the severe environments.

The second embodiment of the present invention is an electrolyte for an electrolytic capacitor containing a salt and a solvent, wherein the electrolyte satisfies the relationships of formulae (I):

$$Y \geq -7.5X+150, \text{ and } X \geq 4, Y>0 \tag{I}$$

wherein X represents an electrolytic conductivity (mS·cm$^{-1}$) at 25° C., and Y represents a withstand voltage (V) of a capacitor.

When the types and concentrations of the salt and the solvent which are constituents of the electrolyte are selected so that the electrolytic conductivity X and the withstand voltage Y satisfy the relationships of formulae (I), an electrolytic capacitor having low impedance and excellent voltage proof property can be obtained.

The electrolytic conductivity X in formulae (I) is an electrolytic conductivity X (mS·cm$^{-1}$) of an electrolyte at 25° C., and can be measured using an electrolytic conductivity meter. In the present invention, the electrolytic conductivity X is preferably 4 mS·cm$^{-1}$ or more, more preferably 8 mS·cm$^{-1}$ or more. Because the use of an electrolyte having a higher electrolytic conductivity makes it possible to obtain an electrolytic capacitor having lower impedance or lower equivalent series resistance. The upper limit of the electrolytic conductivity is desirably higher, but generally about 30 mS·cm$^{-1}$.

The withstand voltage Y in formulae (I) is a withstand voltage of an electrolytic capacitor, and defined as a voltage value at which the first spike or scintillation is observed in a voltage-time ascending curve obtained when applying a constant current to the electrolytic capacitor. In the present invention, a method for measuring the withstand voltage Y is as follows.

Figure 1:
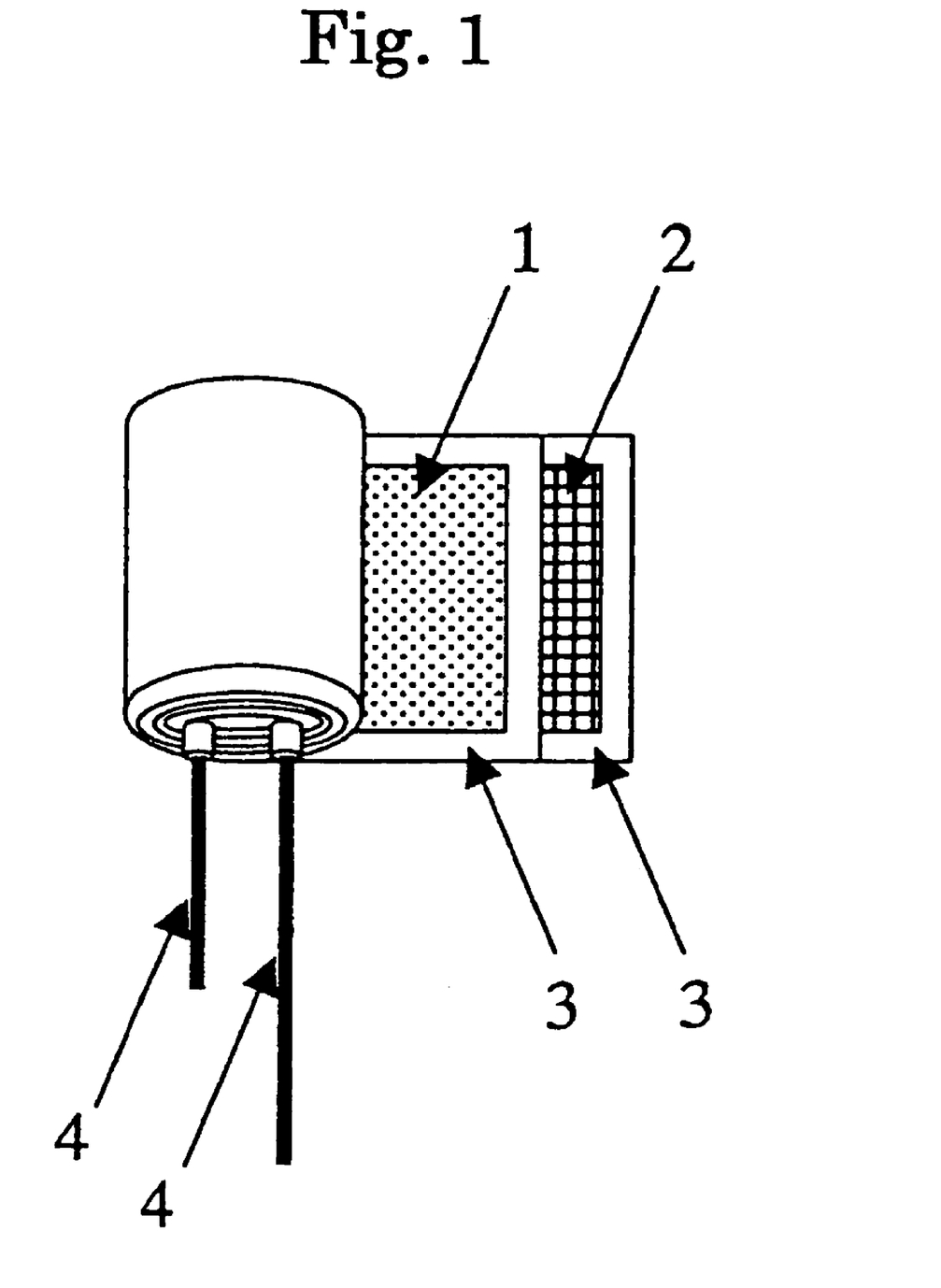
FIG. 1 is a perspective view of an element of an electrolytic capacitor in a spirally-wound form, wherein reference numeral 1 designates an anode foil, reference numeral 2 designates a cathode foil, reference numeral 3 designates a separator and reference numeral 4 designates a lead wire.
Figure 2:
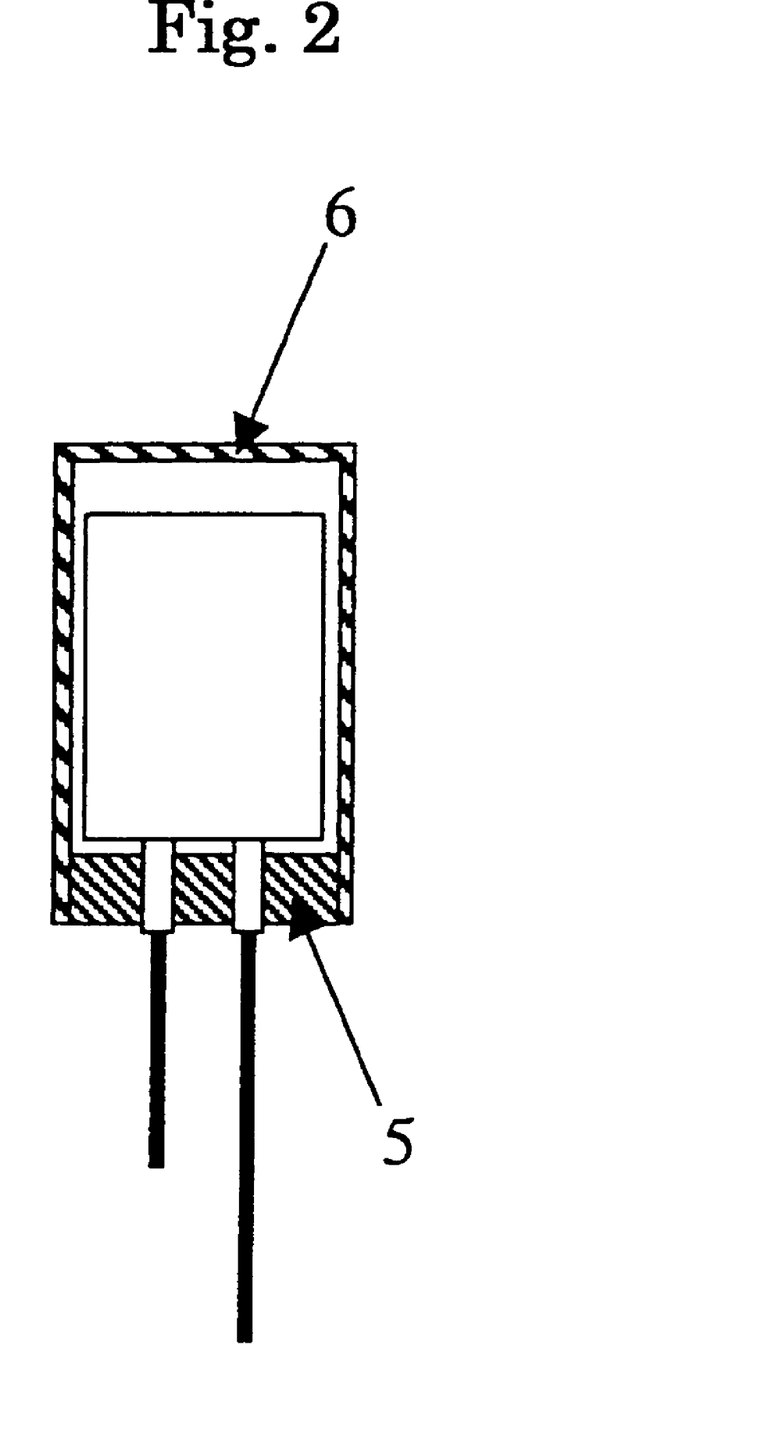
FIG. 2 is a cross-sectional view of an electrolytic capacitor, wherein reference numeral 5 designates a sealing material and reference numeral 6 designates an outer casing.

Measuring method: As an aluminum electrolytic capacitor element, a capacitor having a spirally-wound form structure (casing size: 10φ×20 L; rated voltage: 200 V; capacitance: 20 μF) is used (FIG. 1). An aluminum electrolytic capacitor having a structure such that the spirally-wound form element is impregnated with an electrolyte and then placed in an aluminum outer casing, and the casing is sealed by a butyl rubber vulcanized by a peroxide, is prepared (FIG. 2). A constant current of 10 mA is applied to the capacitor at 125° C. to obtain a voltage-time curve, thus determining a withstand voltage Y.

In the present invention, the withstand voltage Y may be more than 0 V, preferably 50 V or more, further preferably 100 V or more. Because a higher withstand voltage makes it possible to prepare an electrolytic capacitor having a higher rated voltage, and the safety is improved when too high a voltage is applied to the electrolytic capacitor by misuse. The upper limit of the withstand voltage is desirably higher, but generally about 300 V.

With respect to the combination of the salt and the solvent contained in the electrolyte of the present invention, there is no particular limitation as long as the formulae (I) above are satisfied. Examples include those having a tetrafluoroaluminate (e.g., a quaternary onium salt, an amine salt, an ammonium salt and an alkali metal salt of tetrafluoroaluminate) or the combination of the tetrafluoroaluminate and a hydrogenphthalate, a hydrogenmaleate, etc. as a salt, and at least one member selected from the group consisting of carbonic esters, carboxylic esters, phosphoric esters, nitrites, amides, sulfones, alcohols and water as a solvent.

The tetrafluoroaluminate is a salt comprising a tetrafluoroaluminate ion as an anion component as mentioned in connection with the first embodiment. Specific examples include quaternary onium salts, amine salts, ammonium salts and alkali metal salts of tetrafluoroaluminate, and specific examples and preferred examples of cation components of these salts include those mentioned in connection with the first embodiment. When a tetrafluoroaluminate is used, the electrolyte may contain an anion component other than the tetrafluoroaluminate ion, and specific examples of other anion components include those mentioned in connection with the first embodiment. The amount of the tetrafluoroaluminate ion in the anion component is preferably 5 to 100 mol %, more preferably 30 to 100 molt, especially preferably 50 to 100 molt, most preferably 100 mol %. When a tetrafluoroaluminate and a hydrogenphthalate, a hydrogenmaleate, etc. are used in combination as a salt, it is preferred that the tetrafluoroaluminate is a main component, and the amount of the tetrafluoroaluminate is preferably 50% by weight or more, more preferably 60% by weight or more, further preferably 70% by weight or more based on the total weight of the salts, and a larger tetrafluoroaluminate amount is preferred.

The concentration of the salt used in the electrolyte of the present invention is preferably 5 to 40% by weight, more preferably 10 to 35% by weight, but, generally, the lower the salt concentration is, the withstand voltage of an electrolyte tend to become higher so that the optimum concentration may be determined from a desired rated voltage of the capacitor. When the salt is used in an electrolytic capacitor, it is necessary that the salt have a high purity, and therefore the salt is used after purified by recrystallization or extraction with a solvent so that it has a desired purity, if necessary.

As the solvent, as mentioned above, there can be mentioned at least one member selected from the group consisting of carbonic esters, carboxylic esters, phosphoric esters, nitrites, amides, sulfones, alcohols and water, and specific examples and preferred examples of solvents include those mentioned in connection with the first embodiment. It is preferred that the amount of the solvent in the electrolyte is 50% by weight or more, and from the viewpoint of safety, it is preferred that the solvent contains a non-aqueous solvent having a flash point of 70° C. or higher.

From the viewpoint of properties of an electrolytic capacitor, as more preferred embodiments, the electrolyte of the second embodiment of the present invention is classified into two embodiments, i.e., the electrolyte, wherein the main component of the solvent belongs to a high boiling-point solvent group, and the electrolyte, wherein the main component of the solvent belongs to a low boiling-point solvent group.

The case, wherein the main component of the solvent belongs to a high boiling-point solvent means, when the solvent contained in the electrolyte is classified into a high boiling-point solvent group {boiling point: 250° C. or higher; melting point: −60 to 40° C.; permittivity ($\epsilon$, 25° C.): 25 or more}, a low boiling-point solvent group {boiling point: 190° C. or higher to lower than 250° C.; melting point: −60 to 40° C.; permittivity ($\epsilon$, 25° C.): 25 or more} and a solvent group which does not belong to any of the above groups for convenience, the case, wherein the weight ratio of the solvent belonging to the high boiling-point solvent group is equal to or larger than the weight ratio of the solvent belonging to the low boiling-point solvent group. This involves a mixed solvent in which all the solvents belong to the high boiling-point solvent group and no solvent belonging to the low boiling-point solvent group is contained, and a single solvent belonging to the high boiling-point solvent group. On the other hand, the case, wherein the main component of the solvent belongs to a low boiling-point solvent group means the case, wherein the weight ratio of the solvent belonging to the low boiling-point solvent group is larger than the weight ratio of the solvent belonging to the high boiling-point solvent group. This involves a mixed solvent in which all the solvents belong to the low boiling-point solvent group and no solvent belonging to the high boiling-point solvent group is contained, and a single solvent belonging to the low boiling-point solvent group. In the electrolyte of the present invention, the solvent mainly belongs to either the high boiling-point solvent group or the low boiling-point solvent group, and a solvent which does not belong to any of these groups is present as a minor component, generally, in an amount of 40% by weight or less.

(1) The case, wherein the main component of the solvent belongs to the high boiling-point solvent In the electrolyte which satisfies the formulae (I), when the electrolyte contains 50% by weight or more of a solvent and the main component of the solvent belongs to the high boiling-point solvent group (boiling point: 250° C. or higher; melting point: −60 to 40° C.; permittivity ($\epsilon$, 25° C.): 25 or more), an electrolytic capacitor having especially excellent thermal stability can be obtained using this electrolyte. From the viewpoint of achieving excellent thermal stability, the amount of the solvent belonging to the high boiling-point solvent group is preferably 60% by weight or more, more preferably 70% by weight or more, especially preferably 100% by weight based on the total weight of the solvents. Examples of solvents used in the electrolyte include sulfones, and especially preferred are sulfolane and 3-methylsulfolane. By using such an electrolyte, there can be obtained an electrolytic capacitor having low impedance and high withstand voltage, which ensures that it can operate for 1,000 hours or longer at an environment temperature of 110 to 150° C.

(2) The case, wherein the main component of the solvent has relatively low boiling-point In the electrolyte which satisfies the formulae (I), when the electrolyte contains 50% by weight or more of a solvent and the main component of the solvent belongs to the low boiling-point solvent group (boiling point: 190° C. or higher to lower than 250° C.; melting point: −60 to 40° C.; permittivity ($\epsilon$, 25° C.): 25 or more), an electrolytic capacitor having especially low impedance can be obtained using this electrolyte. From the viewpoint of obtaining an electrolytic capacitor having low impedance, the amount of the solvent belonging to the low boiling-point solvent group is preferably 60% by weight or more, more preferably 70% by weight or more, especially preferably 100% by weight based on the total weight of the solvents. It is further preferred that the electrolyte satisfies the relationship of formula (III):

$$Y \geq -7.5X + 220 \tag{III}$$

Examples of solvents as a main component used in the electrolyte include at least one solvent selected from the group consisting of carbonic esters, carboxylic esters, phosphoric esters, nitrites, amides and alcohols, and especially preferred are γ-butyrolactone and ethylene glycol. By using such an electrolyte, there can be obtained an electrolytic capacitor having extremely low impedance and high withstand voltage.

In the electrolyte of the second embodiment of the present invention, from the viewpoint of properties of a capacitor (impedance, withstand voltage, thermal stability, life, reliability, etc.), especially preferred combinations of the salt and the solvent are the combination of 1-ethyl-2,3-dimethylimidazolinium tetrafluoroaluminate or 1,2,3,4-tetramethylimidazolinium tetrafluoroaluminate as a salt and sulfolane as a solvent, and the combination of 1-ethyl-2,3-dimethylimidazolinium tetrafluoroaluminate or 1,2,3,4-tetramethylimidazolinium tetrafluoroaluminate as a salt and γ-butyrolactone as a solvent. A solvent using both sulfolane and γ-butyrolactone is also preferred.

In the electrolyte of the present invention, in addition to the salt and the solvent, different additives may be used. Specific examples and preferred examples of additives and amounts of the additive added include those mentioned in connection with the first embodiment. In the second embodiment, the electrolytic conductivity and withstand voltage values are those measured with respect to an original electrolyte comprising a salt and a solvent, which contains no additive. When the original electrolyte satisfies the formulae (I), (II) and (III), which further contains an additive in case of necessity, is also involved within the scope of the present invention.

In the electrolyte of the present invention, when a non-aqueous solvent is used as a solvent for the electrolyte, the moisture content is controlled, so that the life properties of a capacitor using such an electrolyte are more stable. The control of the moisture content is the same as that mentioned above in connection with the first embodiment.

The present invention also provides an electrolytic capacitor using the electrolyte of the second embodiment. The method for producing an electrolytic capacitor and parts of the electrolytic capacitor are the same as those mentioned above in connection with the first embodiment.

EXAMPLES

Hereinbelow, the present invention will be described in more detail with reference to the following Examples. These examples should not be construed as limiting the scope of the present invention. The materials, ratios, formulations and procedure in the following Examples can be appropriately changed as long as the aim of the present invention is not sacrificed.

(1) Synthesis of Triethylmethylammonium Tetrafluoroaluminate 6.90 g (50.0 mmol) of aluminum fluoride trihydrate was weighed and placed in a round flask made of PFA, and air in the flask was evacuated and then replaced by argon gas. While feeding argon gas to the flask through its inlet, 100 ml of dehydrated acetonitrile was added and the flask was sealed followed by stirring for 30 minutes. Then, while feeding argon gas similarly, 9.46 g (50.0 mmol) of triethylmethylammonium fluoride trihydrate was added portion wise, and the resultant mixture was further stirred for about 3 hours. The unreacted solid was filtered off, and then the solvent was distilled off to obtain about 9 g of white crude crystal of triethylmethylammonium tetrafluoroaluminate. This was subjected to recrystallization from 10 g of isopropanol. The amount of the product was 5.50 g, and the yield was 50% based on the charged raw material. Identification was made by elemental analysis and NMR, and a melting point was measured by TG-DTA.

Elemental analysis: Theoretical value: C: 38.36, H: 8.28, N: 6.39, Al: 12.31, F: 34.67 Analysis value: C: 38.40, H: 7.70, N: 6.32, Al: 12.0, F: 33.50 $^{19}$F-NMR: −190 ppm {sixtuplet, J=34 Hz, CFCl$_3$ reference in (CD$_3$)$_2$SO solvent}$^{27}$Al-NMR: 49 ppm {quintuplet, J=34 Hz, AlCl$_3$·3H$_2$O reference in (CD$_3$)$_2$SO solvent}Melting point: 320° C. (decomposed)

(2) Preparation of Aluminum Electrolytic Capacitor, and Evaluation of Electrolytic Conductivity and Voltage Proof Property Example 1, Comparative Examples 1 and 2

In Example 1, the above-obtained triethylmethylammonium tetrafluoroaluminate was dissolved in γ-butyrolactone to prepare an electrolyte having a concentration of 25% by weight. With respect to the electrolyte in Example 1, an electrolytic conductivity (25° C.) of the electrolyte immediately after the preparation and an electrolytic conductivity of the electrolyte subjected to heating test at 125° C. for 25 hours were individually measured. Then, an aluminum electrolytic capacitor having a structure such that the spirally-wound form element shown in FIG. 1 was impregnated with the electrolyte and placed in an aluminum outer casing, and the casing was sealed by a butyl rubber vulcanized by a peroxide was prepared (FIG. 2). The withstand voltage value was determined as a voltage value at which the first spike or scintillation was observed in a voltage-time ascending curve obtained by applying a constant current of 10 mA to the electrolytic capacitor at 125° C. Specifications of the aluminum electrolytic capacitor used were such that the casing size was 10φ×20 L, the rated voltage was 200 V and the capacitance was 20 μF. Further, in Comparative Examples, electrolytes were prepared in accordance with the same procedure as in Example 1 except that triethylmethylammonium hydrogenphthalate-(Comparative Example 1) and 1-ethyl-2,3-dimethylimidazolinium hydrogenphthalate (Comparative Example 2) were used respectively as a salt, and the respective evaluations were conducted. The results are shown in Table 1.

TABLE 1

| Experimental Example | Salt | Concentration wt % | Electrolytic conductivity/ mS cm$^{-1}$ Initial value | Electrolytic conductivity/ mS cm$^{-1}$ After heating | Withstand voltage V |
|---|---|---|---|---|---|
| Example 1 | Et$_3$MeN$^+$ AlF$_4^-$ | 25 | 21.00 | 21.00 | 165 |
| Comparative example 1 | Et$_3$MeN$^+$ PH$^-$ | 25 | 10.86 | 10.77 | 60 |
| Comparative example 2 | EDMI$^+$ PH$^-$ | 25 | 11.89 | 10.84 | 55 |

*EDMI$^+$ denotes a 1-ethyl-2,3-dimethylimidazolinium ion, and PH$^-$ denotes a hydrogenphthalate ion.

From a comparison between Example and Comparative Examples, it is found that the electrolytic conductivity in Example 1 is as high as about two times those in Comparative Examples, and the change of the electrolytic conductivity in Example 1 by heating is small, indicating that the thermal stability is excellent. In addition, the withstand voltage value in Example 1 is as high as about 2.5 to 3 times those in Comparative Examples.

(3) Other Examples

Ingredients were mixed together by the formulations shown in Table 2 mentioned below to prepare electrolytes. In the Table, part(s) for the ingredients was given by weight. With respect to the electrolytes obtained, an electrolytic conductivity and a withstand voltage property were evaluated. First, an electrolytic conductivity at 25° C. was measured. Then, a withstand voltage value at 125° C. was measured in the same manner as in Example 1. The results are shown in Table 2.

TABLE 2

| Experimental Example | Salt | Concentration wt % | Electrolytic conductivity/ mS cm$^{-1}$ Initial value | Electrolytic conductivity/ mS cm$^{-1}$ After heating | Withstand voltage V |
|---|---|---|---|---|---|
| Example 2 | Et$_3$MeN$^+$ AlF$_4^-$ | 10 | 11.08 | 11.08 | 195 |
| Comparative example 3 | Et$_3$MeN$^+$ PH$^-$ | 14 | 8.17 | 7.98 | 75 |
| Comparative example 4 | EDMI$^+$ PH$^-$ | 10 | 7.13 | 6.60 | 80 |

*PH$^-$ denotes a hydrogenphthalate ions, and EDMI$^+$ denotes a 1-ethyl-2,3-dimethylimidazolinium ion.

From a comparison between Example and Comparative Examples in Table 2, it is found that Example has a higher electrolytic conductivity and a higher withstand voltage. Therefore, the electrolyte of the present invention is preferred in aluminum electrolytic capacitors in any applications for low impedance grade or high rated voltage.

Examples 3 to 15 and
Comparative Examples 5 to 10

Further, in Examples 3 to 14, ingredients were mixed together by the formulations shown in Table 3 to prepare electrolytes. In the Table, part(s) for the ingredients was given by weight. As silica, an ethylene glycol sol of silica having an average particle size of about 25 nm was used. Further, electrolytes in Comparative Examples 5 to 10 were prepared using, instead of 1-ethyl-2,3-dimethylimidazolinium tetrafluoroaluminate used in Examples 3 to 8, 1-ethyl-2,3-dimethylimidazolinium hydrogenphthalate in the same amount in terms of parts by weight.

With respect to the electrolytes obtained in Examples 3 to 14 and Comparative Examples 5 to 10, an electrolytic conductivity (25° C.) immediately after the preparation was measured. Then, using the respective electrolytes, aluminum electrolytic capacitors each having a rated voltage of 200 V and a capacitance of 20° F. were prepared in the same manner as in Example 1, and a withstand voltage value (125° C.) was measured. The results are shown in Table 3.

TABLE 3

|  | Example 3 | Example 4 | Example 5 | Example 6 | Example 7 | Example 8 |
|---|---|---|---|---|---|---|
| 1-Ethyl-2,3-dimethylimidazolinium tetrafluoroaluminate | 25 | 25 | 25 | 25 | 20 | 20 |
| 1,2,3,4-Tetramethylimidazolinium tetrafluoroaluminate |  |  |  |  |  |  |
| 1-Ethyl-2,3-dimethylimidazolinium hydrogenphthalate |  |  |  |  |  |  |
| γ-Butyrolactone | 75 |  | 35.5 |  | 72 | 72 |
| Sulfolane |  | 75 | 35.5 | 35.5 |  |  |
| 3-Methylsulfolane |  |  |  | 35.5 |  |  |
| Ethylene glycol |  |  |  |  | 8 | 8 |
| Silica |  |  |  |  |  | 6 |
| Phosphoric acid |  |  |  |  |  |  |
| Boric acid |  |  |  |  |  |  |
| p-Nitro benzoic acid |  |  |  |  |  |  |

TABLE 3-continued

|  |  |  |  |  |  |  |
|---|---|---|---|---|---|---|
| Polyethylene glycol (Average molecular weight: 300) |  |  |  |  |  |  |
| Electrolytic conductivity/ mS cm$^{-1}$ at 25° C. | 24.10 | 6.56 | 14.41 | 5.94 | 20.50 | 19.38 |
| Withstand voltage/V at 125 ° C. | 160 | 160 | 165 | 170 | 170 | 185 |

|  | Comp. ex. 5 | Comp. ex. 6 | Comp. ex. 7 | Comp. ex. 8 | Comp. ex. 9 | Comp. ex. 10 |
|---|---|---|---|---|---|---|
| 1-Ethyl-2,3-dimethylimidazolinium tetrafluoroaluminate |  |  |  |  |  |  |
| 1,2,3,4-Tetramethylimidazolinium tetrafluoroaluminate |  |  |  |  |  |  |
| 1-Ethyl-2,3-dimethylimidazolinium hydrogenphthalate | 25 | 25 | 25 | 25 | 20 | 20 |
| γ-Butyrolactone | 75 |  | 35.5 |  | 72 | 72 |
| Sulfolane |  | 75 | 35.5 | 35.5 |  |  |
| 3-Methylsulfolane |  |  |  | 35.5 |  |  |
| Ethylene glycol |  |  |  |  | 8 | 8 |
| Silica |  |  |  |  |  | 6 |
| Electrolytic conductivity/ mS cm$^{-1}$ at 25° C. | 11.70 | 3.24 | 7.34 | 2.94 | 9.86 | 9.31 |
| Withstand voltage/V at 125° C. | 60 | 55 | 60 | 60 | 70 | 80 |

|  | Example 9 | Example 10 | Example 11 | Example 12 | Example 13 | Example 14 |
|---|---|---|---|---|---|---|
| 1-Ethyl-2,3-dimethylimidazolinium tetrafluoroaluminate | 25 | 25 | 25 | 25 |  | 12.5 |
| 1,2,3,4-Tetramethylimidazolinium tetrafluoroaluminate |  |  |  |  | 25 |  |
| 1-Ethyl-2,3-dimethylimidazolinium hydrogenphthalate |  |  |  |  |  | 12.5 |
| γ-Butyrolactone | 75 | 75 | 75 | 75 | 75 | 75 |
| Sulfolane |  |  |  |  |  |  |
| 3-methylsulfolane |  |  |  |  |  |  |
| Ethylene glycol |  |  |  |  |  |  |
| Silica |  |  |  |  |  |  |
| Phosphoric acid | 1 |  |  |  |  |  |
| Boric acid |  | 1 |  |  |  |  |
| p-Nitro benzoic acid |  |  | 1 |  |  |  |
| Polyethylene glycol (Average molecular weight: 300) |  |  |  | 1 |  |  |
| Electrolytic conductivity/ mS cm$^{-1}$ at 25° C. | 23.85 | 23.81 | 23.85 | 23.05 | 24.00 | 17.82 |
| Withstand voltage/V at 125° C. | 165 | 165 | 165 | 170 | 160 | 110 |

Figure 3:
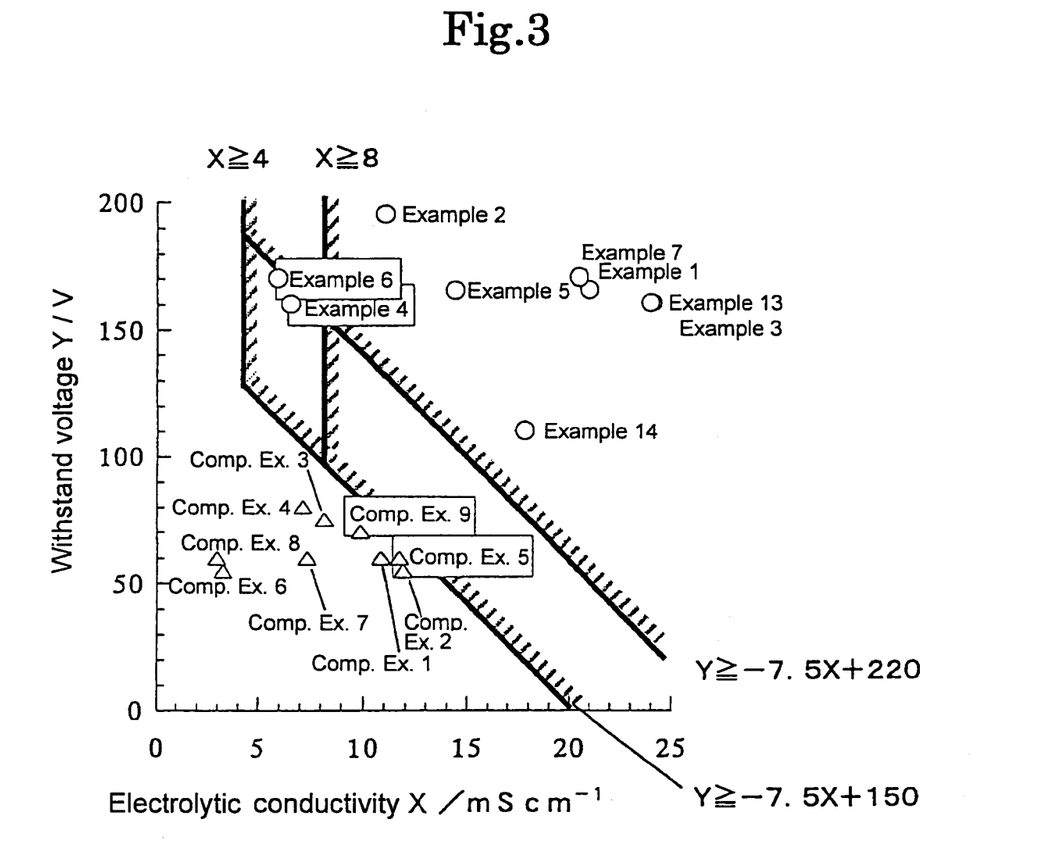
FIG. 3 is a graph showing the relationship between an electrolytic conductivity X of an electrolyte for an electrolytic capacitor of the present invention and a withstand voltage of an electrolytic capacitor.

In Table 3, from a comparison between Examples and Comparative Examples in which the formulation of the electrolyte is substantially the same as that of the corresponding Example except for the kind of the salt (Comparative Examples 5 to 10 correspond to Examples 3 to 8, respectively), it is found that every Examples have a higher electrolytic conductivity and a higher withstand voltage value. As can be seen from FIG. 3, Examples satisfy the following relationships of formulae (I):

$$Y \geq -7.5X + 150, \text{ and } X \geq 4, Y > 0 \quad (I).$$

The electrolyte of the present invention is preferred in aluminum electrolytic capacitors in any applications for low impedance grade or high rated voltage.

(4) Evaluation of Device Properties and Appearance

Next, using the electrolytes in Examples 1, 3 and 4, aluminum electrolytic capacitors each having a rated voltage for use of 100 V and a capacitance of 56 µF were prepared. Further, in Example 15, using an electrolyte obtained by adding water in an amount of 3% by weight to a γ-butyrolactone solution of 25% by weight 1-ethyl-2,3-dimethylimidazolinium tetrafluoroaluminate, an aluminum electrolytic capacitor was prepared in the same manner as mentioned above. The electrolyte used in Example 3 had a moisture content of 0.1% by weight as measured by means of a Karl Fischer moisture content meter. A capacitance at 120 Hz and an equivalent series resistance (ESR) at 100 kHz were measured. In addition, the capacitors prepared were allowed to stand under no load at 125° C. for 500 hours, and then changes in the device properties and appearance were examined. On the other hand, when using the electrolytes in Comparative Examples 1, 5 and 6, preparation of a capacitor was impossible due to the low withstand voltage. The results are shown in Table 4.

TABLE 4

| | Example 1 | Example 3 | Example 4 | Example 15 |
|---|---|---|---|---|
| Capacitance/μF | 54.8 | 54.8 | 54.8 | 54.5 |
| Capacitance (after unloading test)/μF | 55.9 | 53.7 | 55.2 | 38.4 |
| Equivalent series resistance/Ω | 0.0066 | 0.0063 | 0.0105 | 0.0073 |
| Equivalent series resistance (after unloading test)/Ω | 0.0067 | 0.0063 | 0.0107 | 0.0545 |
| Appearance (after unloading test) | Seal portion blistered | No change | No change | Seal portion blistered |

*Preparation impossible due to low withstand voltage in Comparative Examples 1, 5 and 6.

As can be seen from Table 4, preparation of capacitors using the electrolytes in Comparative Examples 1, 5 and 6 was impossible due to the low withstand voltage, whereas, capacitors having excellent device properties were able to be prepared using the electrolytes in Examples 1, 3, 4 and 15. Especially in the capacitors using the electrolytes in Examples 1, 3 and 4, after the unloading test, almost no change was found in the device properties, indicating that the capacitors had excellent thermal stability. In addition, with respect to the appearance, in the capacitors using the electrolytes in Examples 1 and 15, blistering was observed only in the sealing rubber portion, suggesting that gas generated in the capacitors, whereas, in the capacitors using the electrolytes in Examples 3 and 4, such blistering was not found, indicating that the capacitors had more excellent thermal stability.

INDUSTRIAL APPLICABILITY

According to the present invention, an electrolyte for electrolytic capacitor having high electrolytic conductivity and excellent thermal stability as well as excellent voltage proof property can be obtained. Further, by using this electrolyte for an electrolytic capacitor, an electrochemical element having low impedance and excellent thermal stability as well as excellent voltage proof property can be obtained.

The invention claimed is:

1. An electrolyte for an electrolytic capacitor containing a salt and a solvent, wherein the electrolyte satisfies the relationships of formulae (I):

$$Y \geq -7.5X+150, \text{ and } X \geq 4, Y > 0 \quad \text{(I)}$$

wherein X represents an electrolytic conductivity (mS·cm$^{-1}$) at 25° C., and Y represents a withstand voltage (V) of a capacitor.

2. The electrolyte for an electrolytic capacitor according to claim 1, which further satisfies the relationships of formulae (II):

$$Y \geq -7.5X+150, \text{ and } X \geq 8, Y > 0 \quad \text{(II)}.$$

3. The electrolyte for an electrolytic capacitor according to claim 1, wherein the electrolyte contains 50% by weight or more of a solvent, and in the solvent, a weight ratio of a solvent having a boiling point of 250° C. or higher, a melting point of −60 to 40° C. and a permittivity (ε, 25° C.) of 25 or more is equal to or larger than a weight ratio of a solvent having a boiling point of 190° C. or higher to lower than 250° C., a melting point of −60 to 40° C. and a permittivity (ε, 25° C.) of 25 or more.

4. The electrolyte for an electrolytic capacitor according to claim 3, wherein the solvent having a boiling point of 250° C. or higher, a melting point of −60 to 40° C. and a permittivity (ε, 25° C.) of 25 or more in the solvent is a sulfone.

5. The electrolyte for an electrolytic capacitor according to claim 4, wherein the sulfone is sulfolane or 3-methylsulfolane.

6. The electrolyte for an electrolytic capacitor according to claim 1, wherein the electrolyte contains 50% by weight or more of a solvent, and in the solvent, a weight ratio of a solvent having a boiling point of 190° C. or higher to lower than 250° C., a melting point of −60 to 40° C. and a permittivity (ε, 25° C.) of 25 or more is larger than a weight ratio of a solvent having a boiling point of 250° C. or higher, a melting point of −60 to 40° C. and a permittivity (ε, 25° C.) of 25 or more.

7. The electrolyte for an electrolytic capacitor according to claim 6 which further satisfies the relationship of formula (III):

$$Y \geq -7.5X+220 \quad \text{(III)}.$$

8. The electrolyte for an electrolytic capacitor according to claim 6, wherein the solvent having a boiling point of 190° C. or higher to lower than 250° C., a melting point of −60 to 40° C. and a permittivity (ε, 25° C.) of 25 or more in the solvent is at least one solvent selected from the group consisting of carbonic esters, carboxylic esters, phosphoric esters, nitriles, amides and alcohols.

9. The electrolyte for an electrolytic capacitor according to claim 8, wherein the solvent having a boiling point of 190° C. or higher to lower than 250° C., a melting point of −60 to 40° C. and a permittivity (ε, 25° C.) of 25 or more in the solvent is γ-butyrolactone or ethylene glycol.

10. The electrolyte for an electrolytic capacitor according to claim 1, wherein the electrolyte contains a tetrafluoroaluminate ion.

11. The electrolyte for an electrolytic capacitor according to claim 10, wherein the tetrafluoroaluminate ion is contained in the form of at least one salt selected from the group consisting of quaternary onium salts, amine salts, ammonium salts and alkali metal salts of tetrafluoroaluminate.

12. The electrolyte for an electrolytic capacitor according to claim 11, wherein the quaternary onium salt is at least one salt selected from the group consisting of quaternary ammonium salts, quaternary phosphonium salts, quaternary imidazolium salts and quaternary amidinium salts.

13. The electrolyte for an electrolytic capacitor according to claim 11, wherein the quaternary onium salt has 4 to 12 carbon atoms in total.

14. The electrolyte for an electrolytic capacitor according to claim 11, wherein a quaternary onium ion of the quaternary onium salt is at least one ion selected from the group consisting of tetraethylammonium, triethylmethylammonium, diethyldimethylammonium, ethyltrimethylammonium, tetramethylammonium, N,N-dimethylpyrrolidinium, N-ethyl-N-methylpyrrolidinium, 1,3-dimethylimidazolium, 1,2,3-trimethylimidazolium, 1-ethyl-3-methylimidazolium, 1-ethyl-2,3-dimethylimidazolium, 1,2,3,4-tetramethylimidazolium, 1,3-diethylimidazolium, 2-ethyl-1,3-dimethylimidazolium, 1,3-dimethyl-2-n-propylimidazolium, 1,3-dimethyl-2-n-pentylimidazolium, 1,3-dimethyl-2-n-heptylimidazolium, 1,3,4-trimethylimidazolium, 2-ethyl-1,3,4-trimethylimidazolium, 1,3-dimethylbenzimidazolium, 1-phenyl-3-methylimidazolium, 1-benzyl-3-methylimidazolium, 1-phenyl-2,3-dimethylimidazolium, 1-benzyl-2,3-dimethylimidazolium, 2-phenyl-1,3-dimethylimidazolium, 2-benzyl-1,3-dimethylimidazolium, 1,3-dimethylimidazolinium, 1,2,3-trimethylimidazolinium, 1-ethyl-3-methylimidazolinium, 1-ethyl-2,3-dimethylimidazolinium, 1,2,3,4-tetramethylimidazolinium, 1,3-diethylimidazolinium, 2-ethyl-1,3-dimethylimidazolinium, 1,3-dimethyl-2-n-propylimidazolinium, 1,3-dimethyl-2-n-pentylimidazolinium, 1,3-dimethyl-2-n-heptylimidazolinium, 1,3,4-trimethylimidazolinium, 2-ethyl-1,3,4-trimethylimidazolinium, 1-phenyl-3-methylimidazolinium, 1-benzyl-3-methylimidazolinium, 1-phenyl-2,3-dimethylimidazolinium, 1-benzyl-2,3-dimethylimidazolinium, 2-phenyl-1,3-dimethylimidazolinium and 2-benzyl-1,3-dimethylimidazolinium.

15. The electrolyte for an electrolytic capacitor according to claim 1, wherein the solvent is at least one solvent selected from the group consisting of sulfolane and γ-butyrolactone, and 1-ethyl-2,3-dimethylimidazolinium tetrafluoroaluminate or 1,2,3,4-tetramethylimidazolinium tetrafluoroaluminate is added to the solvent in an amount of 5 to 40% by weight based on the weight of the electrolyte.

16. The electrolyte for electrolytic capacitor according to claim 1, wherein the electrolyte further contains at least one additive selected from the group consisting of nitro compounds, phosphorus compounds, boron compounds, metal oxide particles, polyalkylene glycols and silicone oil.

17. The electrolyte for an electrolytic capacitor according to claim 1, wherein the electrolyte contains 1% by weight or less of moisture.

18. An electrolytic capacitor using the electrolyte for an electrolytic capacitor according to claim 1.

19. An electrolytic capacitor which has an anode electrode having an electrically insulating oxide film on the electrode surface and a cathode electrode placed opposite thereto via a separator, wherein the electrolyte held by the electrolyte for an electrolytic capacitor according to claim 1.

20. An electrolytic capacitor electrolyte, comprising:
a tetrafluoroaluminate ion,
wherein the tetrafluoroaluminate ion is contained in the form of at least one salt selected from the group consisting of quaternary onium salts, amine salts, ammonium salts and alkali metal salts of tetrafluoroaluminate.

21. The electrolytic capacitor electrolyte according to claim 20, wherein the quaternary onium salt is at least one salt selected from the group consisting of quaternary ammonium salts, quaternary phosphonium salts, quaternary imidazolium salts and quaternary amidinium salts.

22. The electrolytic capacitor electrolyte according to claim 20, wherein the quaternary onium salt has 4 to 12 carbon atoms in total.

23. The electrolytic capacitor electrolyte according to claim 20, wherein a quaternary onium ion of the quaternary onium salt is at least one ion selected from the group consisting of tetraethylammonium, triethylmethylammonium, diethyldimethylammonium, ethyltrimethylammonium, tetramethylammonium, N,N-dimethylpyrrolidinium, N-ethyl-N-methylpyrrolidinium, 1,3-dimethylimidazolium, 1,2,3-trimethylimidazolium, 1-ethyl-3-methylimidazolium, 1-ethyl-2,3-dimethylimidazolium, 1,2,3,4-tetramethylimidazolium, 1,3-diethylimidazolium, 2-ethyl-1,3-dimethylimidazolium, 1,3-dimethyl-2-n-propylimidazolium, 1,3-dimethyl-2-n-pentylimidazolium, 1,3-dimethyl-2-n-heptylimidazolium, 1,3,4-trimethylimidazolium, 2-ethyl-1,3,4-trimethylimidazolium, 1,3-dimethylbenzimidazolium, 1-phenyl-3-methylimidazolium, 1-benzyl-3-methylimidazolium, 1-phenyl-2,3-dimethylimidazolium, 1-benzyl-2,3-dimethylimidazolium, 2-phenyl-1,3-dimethylimidazolium, 2-benzyl-1,3-dimethylimidazolium, 1,3-dimethylimidazolinium, 1,2,3-trimethylimidazolinium, 1-ethyl-3-methylimidazolinium, 1-ethyl-2,3-dimethylimidazolinium, 1,2,3,4-tetramethylimidazolinium, 1,3-diethylimidazolinium, 2-ethyl-1,3-dimethylimidazolinium, 1,3-dimethyl-2-n-propylimidazolinium, 1,3-dimethyl-2-n-pentylimidazolinium, 1,3-dimethyl-2-n-heptylimidazolinium, 1,3,4-trimethylimidazolinium, 2-ethyl-1,3,4-trimethylimidazolinium, 1-phenyl-3-methylimidazolinium, 1-benzyl-3-methylimidazolinium, 1-phenyl-2,3-dimethylimidazolinium, 1-benzyl-2,3-dimethylimidazolinium, 2-phenyl-1,3-dimethylimidazolinium and 2-benzyl-1,3-dimethylimidazolinium.

24. An electrolytic capacitor electrolyte, comprising:
a tetrafluoroaluminate ion;
wherein the electrolyte contains 50% by weight or more of a solvent, and the solvent is at least one solvent selected from the group consisting of carbonic esters, carboxylic esters, phosphoric esters, nitriles, amides, sulfones, alcohols and water.

25. The electrolytic capacitor electrolyte according to claim 24, wherein the solvent contains at least one solvent selected from the group consisting of sulfolane and 3-methylsulfolane in an amount of 40% by weight or more based on the total weight of the solvents.

26. The electrolytic capacitor electrolyte according to claim 24, wherein the solvent contains at least one solvent selected from the group consisting of carbonic esters, carboxylic esters, phosphoric esters, nitriles, amides and alcohols in an amount of 40% by weight or more based on the total weight of the solvents.

27. The electrolytic capacitor electrolyte according to claim 26, wherein the solvent contains at least one solvent selected from the group consisting of γ-butyrolactone and ethylene glycol in an amount of 40% by weight or more based on the total weight of the solvents.

28. An electrolytic capacitor electrolyte, comprising:
a tetrafluoroaluminate ion and a solvent;
wherein the solvent is at least one solvent selected from the group consisting of sulfolane and γ-butyrolactone, and 1-ethyl-2,3-dimethylimidazolinium tetrafluoroaluminate or 1,2,3,4-tetramethylimidazolinium tetrafluoroaluminate is added to the solvent in an amount of 5 to 40% by weight based on the total weight of the electrolyte.

29. An electrolytic capacitor electrolyte, comprising:
a tetrafluoroaluminate ion;
wherein the electrolyte further contains at least one additive selected from the group consisting of nitro compounds, phosphorus compounds, boron compounds, metal oxide particles, polyalkylene glycols and silicone oil.

* * * * *

UNITED STATES PATENT AND TRADEMARK OFFICE
CERTIFICATE OF CORRECTION

PATENT NO. : 7,072,173 B2  Page 1 of 1
APPLICATION NO. : 10/704803
DATED : July 4, 2006
INVENTOR(S) : Takeda et al.

It is certified that error appears in the above-identified patent and that said Letters Patent is hereby corrected as shown below:

On the title page, Item (75), the 1$^{st}$ inventor's name is incorrect. Item (75) should read:

-- (75) Inventors: Masayuki Takeda, Mie (JP);
                     Masahiro Takehara, Ibaraki (JP);
                     Makoto Ue, Ibaraki (JP) --

Signed and Sealed this

Seventeenth Day of October, 2006

JON W. DUDAS
*Director of the United States Patent and Trademark Office*